United States Patent
Tombs

(10) Patent No.: US 9,045,664 B2
(45) Date of Patent: Jun. 2, 2015

(54) PRINTING INK IMAGE USING POLYMER OR SALT

(75) Inventor: Thomas Nathaniel Tombs, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 137 days.

(21) Appl. No.: 13/332,406

(22) Filed: Dec. 21, 2011

(65) Prior Publication Data

US 2013/0162703 A1    Jun. 27, 2013

(51) Int. Cl.
| | | |
|---|---|---|
| B41F 19/00 | (2006.01) | |
| G03G 15/22 | (2006.01) | |
| C09D 11/54 | (2014.01) | |
| G03G 15/01 | (2006.01) | |
| G03G 15/00 | (2006.01) | |
| B41M 5/00 | (2006.01) | |
| C09D 11/322 | (2014.01) | |
| C09D 11/40 | (2014.01) | |

(52) U.S. Cl.
CPC ............... *C09D 11/54* (2013.01); *G03G 15/22* (2013.01); *G03G 15/0121* (2013.01); *G03G 15/0194* (2013.01); *G03G 15/6591* (2013.01); *B41M 5/0017* (2013.01); *C09D 11/322* (2013.01); *C09D 11/40* (2013.01)

(58) Field of Classification Search
CPC ...... B41F 19/00; C09D 11/54; C09D 11/322; C09D 11/40; B41M 5/0017
See application file for complete search history.

(56) References Cited

U.S. PATENT DOCUMENTS

| | | | |
|---|---|---|---|
| 5,041,846 A | 8/1991 | Vincent et al. | |
| 5,751,299 A | 5/1998 | Denton et al. | |
| 5,771,054 A | 6/1998 | Dudek et al. | |
| 6,042,888 A | 3/2000 | Sismanis et al. | |
| 6,206,517 B1 * | 3/2001 | Kovacs et al. | 347/101 |
| 6,296,901 B1 | 10/2001 | Boyd et al. | |
| 6,439,713 B1 * | 8/2002 | Noguchi et al. | 347/103 |
| 6,557,991 B2 * | 5/2003 | Koitabashi et al. | 347/101 |
| 6,632,510 B1 | 10/2003 | Waller, Jr. et al. | |
| 6,716,562 B2 * | 4/2004 | Uehara et al. | 430/125.3 |
| 6,767,092 B2 * | 7/2004 | May et al. | 347/103 |
| 7,628,481 B2 * | 12/2009 | Kadomatsu et al. | 347/102 |
| 7,887,177 B2 * | 2/2011 | Doi et al. | 347/103 |
| 2003/0227531 A1 * | 12/2003 | Hosoi et al. | 347/105 |
| 2004/0005155 A1 * | 1/2004 | Miyazaki | 399/2 |
| 2005/0128273 A1 * | 6/2005 | Gore | 347/101 |
| 2007/0165204 A1 * | 7/2007 | Kibayashi et al. | 355/78 |
| 2008/0180502 A1 | 7/2008 | Tran et al. | |
| 2008/0304846 A1 | 12/2008 | Tombs et al. | |
| 2009/0128610 A1 * | 5/2009 | Taniuchi et al. | 347/103 |
| 2010/0075113 A1 | 3/2010 | Schumacher et al. | |

* cited by examiner

*Primary Examiner* — Manish S Shah
*Assistant Examiner* — Jeremy Delozier
(74) *Attorney, Agent, or Firm* — Peyton C. Watkins

(57) ABSTRACT

A method of printing an image on a receiver includes receiving image data for the image. A processor automatically produces data for a polymer pattern and a salt pattern using the image data. A polymer is deposited on the receiver according to the polymer pattern using a polymer-deposition unit. A salt is deposited on the receiver according to the salt pattern using a salt-deposition unit different from the polymer-deposition unit. Liquid ink is deposited on the receiver according to the image data using an inkjet print engine, and at least some of the ink is deposited over the deposited polymer or the deposited salt.

14 Claims, 5 Drawing Sheets

PRINTING INK IMAGE USING POLYMER OR SALT

CROSS-REFERENCE TO RELATED APPLICATIONS

Reference is made to commonly assigned, co-pending U.S. patent application Ser. No. 13/298,358, filed Nov. 17, 2011, entitled "PRODUCING A DEINKABLE PRINT," by Tombs et al; and U.S. patent application Ser. No. 13/298,365, filed Nov. 17, 2011, entitled "PRODUCING A DEINKABLE PRINT," by Tombs et al.; the disclosures of which are incorporated by reference herein.

FIELD OF THE INVENTION

This invention pertains to the field of printing and more particularly to printing on a wide range of substrates.

BACKGROUND OF THE INVENTION

Inkjet printers are useful for producing printed images on receivers (or "imaging substrates"), such as pieces or sheets of paper. Printers typically operate using subtractive color: a substantially reflective receiver is overcoated image-wise with cyan (C), magenta (M), yellow (Y), black (K), and other colorants.

Commonly-used inkjet printers deposit aqueous inks on the receiver to form the image. The inks include CMYK colorants, such as dyes or pigments, to provide color. Only a small portion of the ink is colorant; most is the aqueous carrier fluid used to transport the colorant to the receiver. After printing, this carrier fluid is removed or absorbed into the receiver. However, there is a large volume of carrier fluid to be removed or absorbed, and that volume increases with image quality (higher optical density uses more ink) and amount of the receiver surface that should bear an image. Moreover, the volume to be removed per unit time increases as print speed increases, in order to prevent wet ink from sticking successively-printed sheets together (an effect referred to as "bricking").

To prevent bricking, special inkjet papers are commonly used, especially for high-quality or high-speed printing applications. These papers are capable of rapidly absorbing large volumes of liquid to keep the prints dry. Alternatively, some inkjet printers use drying equipment to permit carrier fluid to be removed more rapidly. U.S. Pat. No. 5,771,054 to Dudek et al. describes a printer in which an inkjet image is printed onto a sheet held on a heated drum. The heat from the drum assists in drying the image. U.S. Pat. No. 5,041,846 to Vincent et al. describes ironing printed sheets with a heated roller to fully dry the printed sheet. However, these schemes require extra equipment, and heating is very energy-intensive.

SUMMARY OF THE INVENTION

Moreover, although these devices may assist in drying, they do not expand the range of substrates on which prints can be made, only the speed with which prints can be made and the density of those prints. It is desirable to make prints on receivers besides uncoated bond paper. Receivers can be non-paper planar media such as plastic sheets, glass, fabric, metal, or other objects. Other examples of paper receivers include semi-absorbent papers such as clay coated papers commonly used in lithographic printing (e.g., Potlatch Vintage Gloss, Potlatch Vintage Velvet, Warren Offset Enamel, and Kromekote papers), and non-absorbent papers such as polymer-coated papers used for photographic printing. There is a need, therefore, for a way of providing inkjet prints on a wide variety of substrates, with reduced bricking, high print quality, and high print speed.

According to an aspect of the present invention, there is provided a method of printing an image on a receiver, comprising:
receiving image data for the image;
a processor automatically producing data for a polymer pattern and a salt pattern using the image data;
depositing a polymer on the receiver according to the polymer pattern using a polymer-deposition unit;
depositing a salt on the receiver according to the salt pattern using a salt-deposition unit different from the polymer-deposition unit;
depositing liquid ink on the receiver according to the image data using an inkjet print engine, wherein at least some of the ink is deposited over the deposited polymer or the deposited salt.

According to an aspect of the present invention, there is provided a method of printing an image on a receiver using a printer, the method comprising:
providing the printer including a polymer-deposition unit, a salt-deposition unit different from the polymer-deposition unit, and an inkjet print engine;
receiving image data for the image;
a processor automatically using the image data to produce data for a polymer pattern and to determine that no salt pattern should be produced;
depositing a polymer on the receiver according to the polymer pattern using the polymer-deposition unit; and
depositing liquid ink on the receiver according to the image data using the inkjet print engine, wherein at least some of the ink is deposited over the deposited polymer.

According to an aspect of the present invention, there is provided a method of printing an image on a receiver using a printer, the method, comprising:
providing the printer including a polymer-deposition unit, a salt-deposition unit different from the polymer-deposition unit, and an inkjet print engine;
receiving image data for the image;
a processor automatically using the image data to produce data for a salt pattern and to determine that no polymer pattern should be produced;
depositing a salt on the receiver according to the salt pattern using the salt-deposition unit; and
depositing liquid ink on the receiver according to the image data using the inkjet print engine, wherein at least some of the ink is deposited over the deposited salt.

According to an aspect of the present invention, there is provided a method of printing an image on a receiver having a receiver type, comprising:
receiving image data for the image;
a processor automatically producing data for a polymer pattern and a salt pattern using the receiver type;
depositing a polymer on the receiver according to the polymer pattern using a polymer-deposition unit;
depositing a salt on the receiver according to the salt pattern using a salt-deposition unit different from the polymer-deposition unit;
depositing liquid ink on the receiver [directly on, or on polymer] according to the image data using an inkjet print engine, wherein at least some of the ink is deposited over the deposited polymer or the deposited salt.

An advantage of this invention is that it provides improved print quality and speed of inkjet prints on a wide range of substrates, even when using readily-available hydrophilic inks. In various embodiments, the polymer or salt patterns are deposited only in the inked areas, and not in the non-inked areas. This saves material compared to flood-coating a receiver with an ink-absorbent material. It also permits a viewer of the print to perceive the physical, textural, and visible attributes of the paper, which attributes a flood-coat would mask. Various embodiments permit the printer to produce prints with different perceived characteristics by, e.g., applying texture or gloss, applying an image-specific protective coating, or applying a UV or other fade-preventive overcoat. These effects and characteristics can be applied to the printed region without changing the characteristics of the paper in unprinted areas.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION OF THE INVENTION

Toner printing processes, such as electrophotographic (EP), electrostatographic, ionographic, and electrographic, and inkjet printing processes can be embodied in devices including printers, copiers, scanners, and facsimiles, and analog or digital devices, all of which are referred to herein as "printers."

Printers operate by depositing marking material (e.g., toner or ink) on a receiver (e.g., paper). In a multi-color printer, each color is referred to as a "component," and there is a different marking material for each color component. The print image for a given color component is a color "separation." A printer typically includes a digital front-end processor (DFE), a deposition engine (also referred to in the art as a "print engine") for applying marking material to the receiver, and one or more post-printing finishing system(s) (e.g. a UV coating system, a glosser, or a laminator). The DFE rasterizes input electronic files into image bitmaps for the deposition engine to print, and permits operator control of the output. The deposition engine takes the rasterized image bitmap from the DFE and renders the bitmap into a form that can control the printing process. The finishing system applies features such as protection, glossing, or binding to the prints. The printer can also include a color management system that captures the characteristics of the image printing process implemented in the deposition engine (e.g. the electrophotographic process) to provide known, consistent color reproduction characteristics for various types of input (e.g. digital camera images or film images).

Multi-component (e.g., color) print images are typically made in a plurality of color imaging modules arranged in tandem, and the print images for each color component are successively transferred to a receiver moving through the modules. The receiver can be a web, or can be a cut sheet held on a transport belt, drum, or plate. Images for each color component can also be transferred to an intermediate, and then transferred together to the receiver.

Some printers can deposit clear marking material (e.g., clear toner or transparent ink). As used herein, "clear" is considered to be a color of toner, as are cyan (C), magenta (M), yellow (Y), black (K), and light black (Lk), but the term "colored marking material" excludes clear marking material. Clear marking material can protect a print from fingerprints and reduce certain visual artifacts. Clear marking material can be similar to colored marking material, but without a colorant (e.g. dye or pigment) incorporated into the toner particles. Printers can also print tinted marking materials. These absorb less light than they transmit, but do contain colorants (e.g., pigments or dyes) that move the hue of light passing through them towards the hue of the tint.

Figure 1:
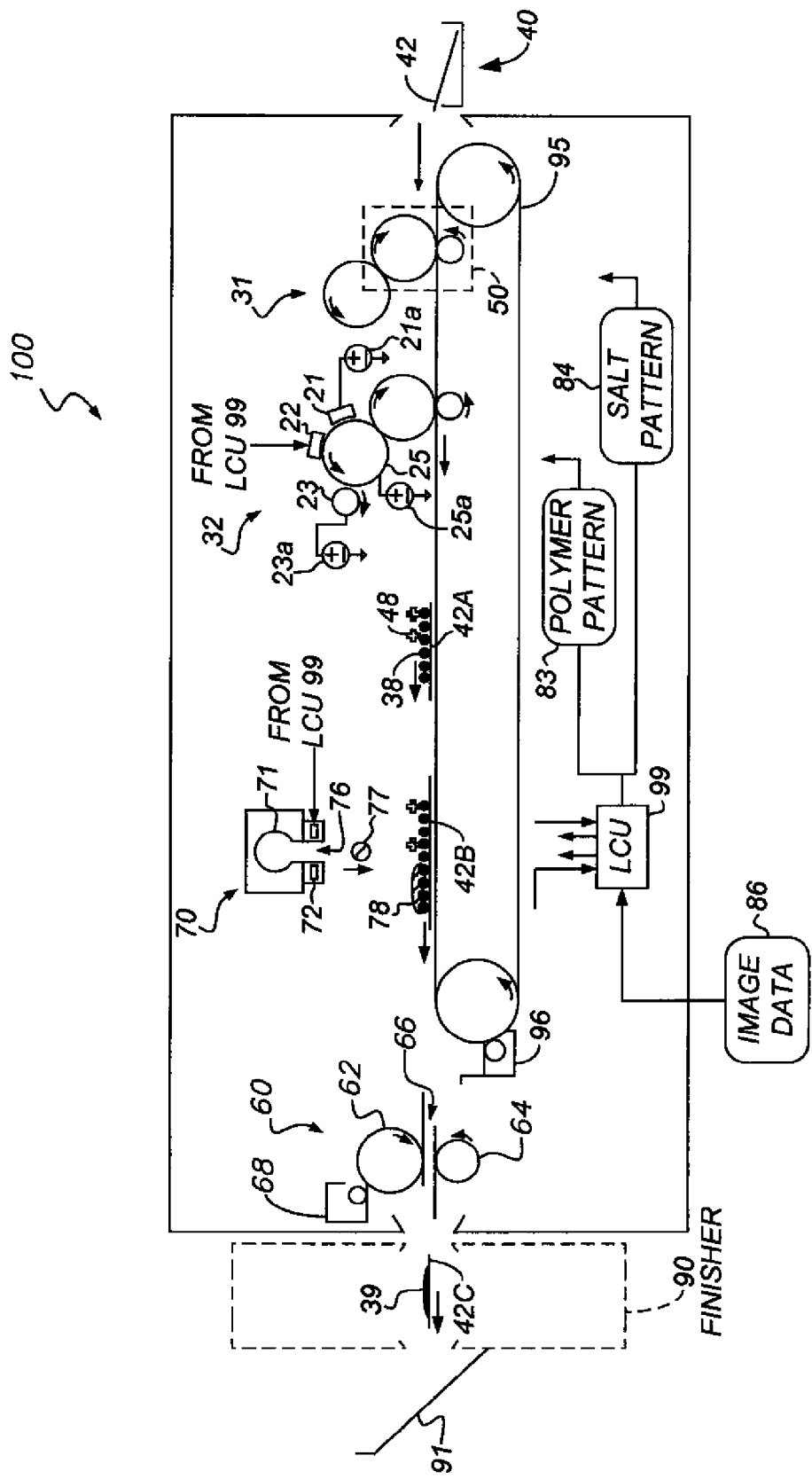
FIG. 1 is an elevational cross-section of a reproduction apparatus.

FIG. 1 is an elevational cross-section showing portions of a printer. Printer 100 produces prints having one or more color components, e.g., four or six components. Various components of printer 100 are shown as rollers; other configurations are also possible, including belts. As used herein, any statement that a substance is "deposited on" the receiver signifies that the substance is transported towards the receiver so that the substance comes into contact with the receiver or with another substance deposited on the receiver at the time of deposition. Therefore, "deposited on" does not necessarily imply that the substance is directly in contact with the receiver. In FIG. 2B, for example, colorant 222c is considered to be deposited on the receiver because it is in contact with polymer particle 238b, which is itself in contact with receiver 42. Colorant 222e is also deposited on receiver 42 by its contact through carrier fluid 221, even if carrier fluid 221 evaporates after the deposition of colorant 222e.

Printer 100 has one or more tandemly-arranged deposition engines 31, 32, 70. Deposition engines 31 and 32 are described below. Deposition engine 70, and any other deposition engine (not shown) present in printer 100, produces a print image for a respective single color component. Deposition engines that produce color separations are also referred to as "print engines."

Deposition engines 31 and 32 are EP deposition engines. Each transfers a material pattern to receiver 42 using respective transfer subsystem 50 (for clarity, only the transfer subsystem 50 of deposition engine 31 is labeled). Receiver 42 is transported from supply unit 40, which can include active feeding subsystems as known in the art, into printer 100. In various embodiments, the pattern is transferred directly from an imaging roller to a receiver 42, or from an imaging roller to one or more transfer roller(s) or belt(s) in sequence in transfer subsystem 50, and thence to receiver 42. Receiver 42 is, for example, a selected section of a web of, or a cut sheet of, planar media such as paper or transparency film.

Each EP deposition engine 31, 32 includes various components. For clarity, these are only shown in EP deposition engine 32. Around photoreceptor 25 are arranged, ordered by the direction of rotation of photoreceptor 25, charger 21, exposure subsystem 22, and toning station 23.

In the EP process, an electrostatic latent image is formed on photoreceptor 25 by uniformly charging photoreceptor 25 and then discharging selected areas of the uniform charge to yield an electrostatic charge pattern corresponding to the desired image (a "latent image"). Charger 21 produces a uniform electrostatic charge on photoreceptor 25 or its surface. Exposure subsystem 22 selectively image-wise discharges photoreceptor 25 to produce a latent image. Exposure subsystem 22 can include a laser and raster optical scanner (ROS), one or more LEDs, or a linear LED array.

After the latent image is formed, charged toner particles are brought into the vicinity of photoreceptor 25 by toning station 23 and are attracted to the latent image to develop the latent image into a visible image. Note that the visible image may not be visible to the naked eye depending on the composition of the toner particles (e.g. clear toner). Toning station 23 can also be referred to as a development station. Toner can be applied to either the charged or discharged parts of the latent image.

After the latent image is developed into a visible image on photoreceptor 25, a suitable receiver 42 is brought into juxtaposition with the visible image. In transfer subsystem 50, a suitable electric field is applied to transfer the toner particles of the visible image to receiver 42 to form the desired material pattern on receiver 42. The imaging process is typically repeated many times with reusable photoreceptors 25.

Various parameters of the components of an EP deposition engine (e.g., deposition engines 31, 32) can be adjusted to control the operation of printer 100. In an embodiment, charger 21 is a corona charger including a grid between the corona wires (not shown) and photoreceptor 25. Voltage source 21a applies a voltage to the grid to control charging of photoreceptor 25. In an embodiment, a voltage bias is applied to toning station 23 by voltage source 23a to control the electric field, and thus the rate of toner transfer, from toning station 23 to photoreceptor 25. In an embodiment, a voltage is applied to a conductive base layer of photoreceptor 25 by voltage source 25a before development, that is, before toner is applied to photoreceptor 25 by toning station 23. The applied voltage can be zero; the base layer can be grounded. This also provides control over the rate of toner deposition during development. In an embodiment, the exposure applied by exposure subsystem 22 to photoreceptor 25 is controlled by LCU 99 to produce a latent image corresponding to the desired material pattern. All of these parameters can be changed.

Further details regarding EP deposition engines 31, 32 and related components are provided in U.S. Pat. No. 6,608,641, issued on Aug. 19, 2003, to Peter S. Alexandrovich et al.; in U.S. Pat. No. 7,502,582, issued Mar. 10, 2009, to Yee S. Ng et al.; and U.S. Ser. No. 12/942,420, filed Nov. 9, 2010, by Tombs et al; all of which are incorporated herein by reference.

In the embodiment shown deposition engine 31 deposits polymer material pattern 38 on receiver 42A. Deposition engine 32 deposits salt material pattern 48 on receiver 42A. Polymer material pattern 38 can include unfused polymer particles. Polymer or salt can be deposited in the same areas as colorant (image content) or larger areas. The latter approach, referred to as "trapping," simplifies registering the salt and polymer layers to the ink. Specific polymer patterns can be deposited to create various imaging effects, such as gloss patterns.

Deposition engine 70 is an inkjet deposition engine. Inkjet deposition engine 70 can include a drop-on-demand printhead, either thermal or piezoelectric, or a continuous printhead, using gas, electrostatic, or other deflection methods. The example shown in FIG. 1 is a thermal drop-on-demand deposition engine. Deposition engine 70 deposits liquid ink on receiver 42B.

Inkjet deposition engine includes ink manifold 71 that contains liquid ink, either under pressure or not. Heater 72 is a resistive ring heater around nozzle 76 that heats ink in ink manifold 71 to its boiling point. The expansion in volume as the liquid boils into gas drives ink drop 77 out of nozzle 76 towards receiver 42B. A previously jetted ink drop is shown; it has spread out on receiver 42B to form ink image 78, as discussed below. Further details of inkjet deposition engines are found in U.S. Ser. No. 13/245,931, filed Sep. 27, 2011; U.S. Pat. Nos. 6,588,888; 4,636,808; and 6,851,796, all of which are incorporated herein by reference.

Piezoelectric drop-on-demand systems provide current to a piezoelectric actuator to cause it to deflect and push an ink drop out of ink manifold 71. Continuous-inkjet systems pressurize the ink in ink manifold 71 and break it into drops in a controlled manner, e.g., by selectively heating the ink stream in an appropriate timing sequence. In gas-deflection systems, two sizes of drops are produced, and an air flow not parallel with the direction of drop travel separates the two sizes of drops. Drops of one size strike the receiver; drops of the other size are caught and reused. Electrostatic-deflection systems charge drops to one of two charge states, and Lorentz forces between the drops and an electrode separate the two sizes of drops.

After polymer material pattern 38 (which can be a toner image), ink image 78, or both are deposited on receiver 42, receiver 42B is subjected to heat or pressure to permanently fix ("fuse") polymer material pattern 38 to receiver 42A. Plural print images, e.g. of separations of different colors, are overlaid on one receiver before fusing to form a multi-color fused image 39 on receiver 42C.

Fuser 60, i.e., a fusing or fixing assembly, fuses polymer material pattern 38 to receiver 42B. Transport web 95 transports the toner-image-carrying receivers (e.g., 42A, 42B) to fuser 60, which fixes the toner particles to the respective receivers 42B by the application of heat and pressure. The receivers 42B are serially de-tacked from transport web 95 to permit them to feed cleanly into fuser 60. Transport web 95 is then reconditioned for reuse at cleaning station 96 by cleaning and neutralizing the charges on the opposed surfaces of the transport web 95.

Fuser 60 includes a heated fusing roller 62 and an opposing pressure roller 64 that form a fusing nip 66 therebetween. In an embodiment, fuser 60 also includes a release fluid application substation 68 that applies release fluid, e.g. silicone oil, to fusing roller 62. Alternatively, wax-containing toner can be used without applying release fluid to fusing roller 62. Other embodiments of fusers, both contact and non-contact, can be employed.

The receivers (e.g., receiver 42C) carrying the fused image (e.g., fused image 39) are transported from the fuser 60 along a path either to output tray 91, or back to deposition engines 31, 32, 70 to create an image on the backside of the receiver (e.g., receiver 42C), i.e. to form a duplex print.

In various embodiments, between fuser 60 and output tray 91, receiver 42B passes through finisher 90. Finisher 90 performs various media-handling operations, such as folding, stapling, saddle-stitching, collating, and binding.

Printer 100 includes logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data.

In the embodiment shown, LCU 99 receives image data 86 for an image to be printed on receiver 42. The image data can be provided, e.g., in JPEG or raw form. A processor in LCU 99 automatically produces polymer pattern data 83 for polymer material pattern 38, and salt pattern data 84 for salt material pattern 48, using image data 86. This is discussed below with reference to FIG. 3. Polymer pattern data 83 is provided to deposition engine 32, and salt pattern data 84 is provided to deposition engine 31. Color separation data (not shown) is provided to inkjet deposition engine 70.

Figure 2A:
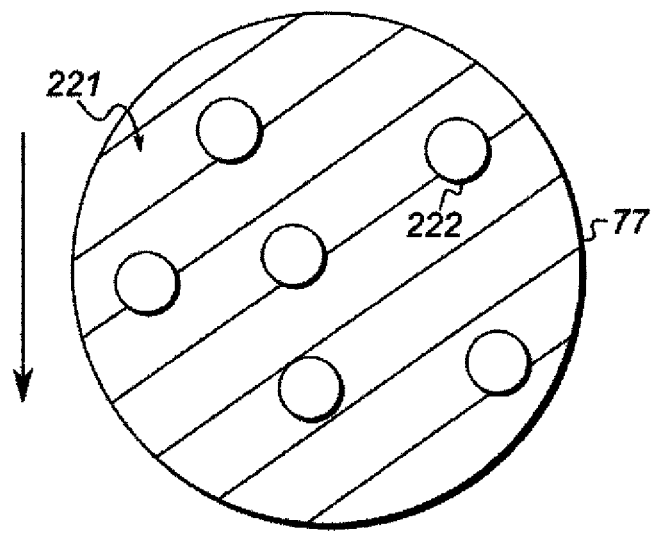
FIGS. 2A-2B show examples of interactions between liquid ink, polymer, and salt according to various embodiments.
Figure 2B:
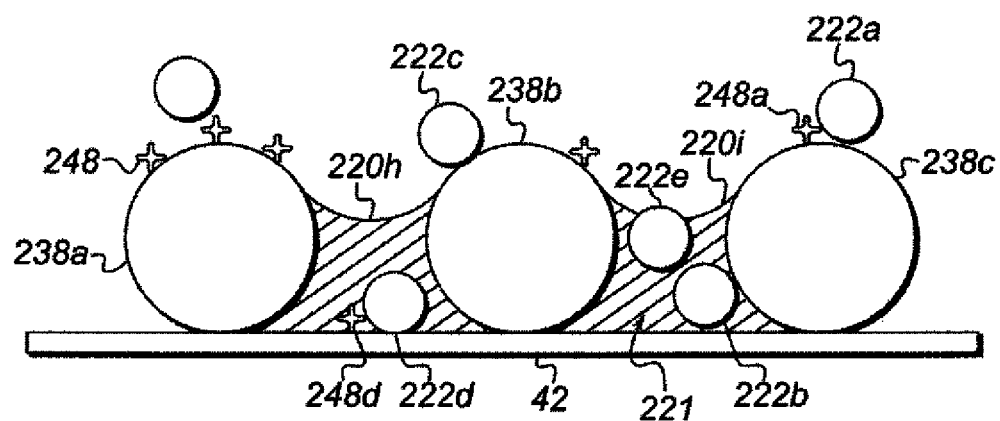

FIGS. 2A-2B show examples of interactions between liquid ink, polymer, and salt according to various embodiments. Referring to FIG. 2A, ink drop 77 travelling towards receiver 42 (FIG. 2B) includes carrier-fluid molecules, e.g., water molecules, which are represented graphically by the hatching of drop 77. The carrier-fluid molecules are a main component of carrier fluid 221. Ink drop 77 also includes colorants 222, e.g., pigment particles suspended in the carrier fluid or dye molecules dissolved in the carrier fluid. Ink drop 77 can also include humectants, surfactants, or salts. These additives help stabilize the ink and reduce the probability of coagulation (agglomeration of suspended pigment particles).

FIG. 2B shows the situation after ink drop 77 has come into contact with receiver 42 bearing polymer particles 238a, 238b, 238c, salts 248, 248a, 248d, or polymer and salt. As shown by hatched fluid areas 220h, 220i, carrier is retained between polymer particles 238a, 238b, 238c by capillary action. This retains some of the carrier fluid 221 away from receiver 42, reducing the rate at which receiver 42 absorbs carrier fluid 221.

Colorants 222 are distributed in various ways. Some have crashed on salts on top of polymers. For example, colorant 222a (which is a pigment in this example) has crashed on salt 248a, which is disposed over polymer particle 238c. Colorant 222b is in suspension in carrier fluid 221 held between polymer particles 238b and 238c. Colorant 222c has been deposited on polymer particle 238b. Colorant 222d has crashed on salt 248d on receiver 42. In various embodiments, colorants 222 can be larger than, smaller than, or the same size as, polymer particles 238a, 238b, 238c.

Salts 248, 248a, 248d, and others shown but not labeled (represented graphically by an open cross), are designed to encourage colorants 222 to come out of solution or suspension, i.e., to separate more rapidly or completely from carrier fluid 221. Salts 248, 248a, 248d can be NaCl. Salts 248, 248a, 248d are not shown to scale and can have any size relative to colorants 222 and polymer particles 238a, 238b, 238c. Salts 248, 248a, 248d can occur in the form of molecules, crystals, grains, or aggregates.

Various embodiments have different characteristics. A polymer particle (e.g., 238a) can include a single polymer chain or multiple polymer chains interwoven. A polymer particle can be ground or milled, or chemically prepared. The polymer and the salt can both be powders. The polymer particles 238a, 238b, 238c can be deposited on the receiver 42, then the salts 248, or salt 248 can be deposited on the receiver and polymer particles 238a, 238b, 238c on top of it. The polymer can be a powder and the salt a solution of salt molecules in a hydrophilic carrier liquid (e.g., carrier fluid 221, FIG. 2A). The polymer can be suspended in a liquid carrier.

In various embodiments, carrier fluid 221 is evaporated out from between polymer particles 238a, 238b, 238c. When carrier fluid 221 evaporates, the pigment particles (including colorants 222b, 222d) remain with receiver 42 and polymer particles 238a, 238b, 238c. Since most of the carrier fluid 221 was kept off receiver 42 by capillary action, receiver 42 did not wet as significantly as it would have without polymer particles 238a, 238b, 238c. For paper receivers, this advantageously reduces localized swelling and shrinking caused by wetting and drying of the receiver, respectively. The use of polymer and optionally salt therefore provides improved drying and reduces warping of a paper receiver 42.

Figure 3:
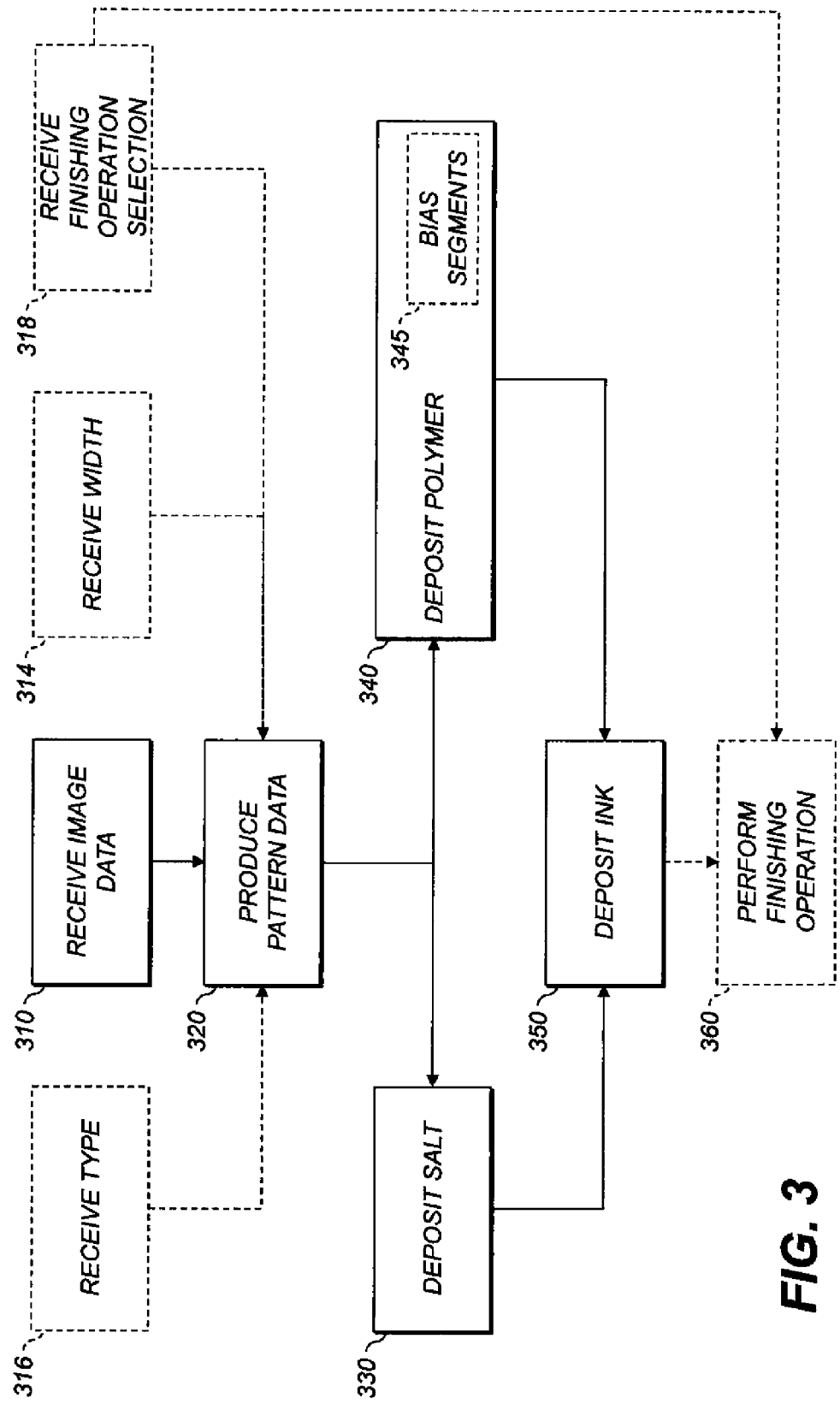
FIG. 3 is a flowchart of methods of printing an image according to various embodiments.

FIG. 3 is a flowchart of methods of printing an image according to various embodiments. Processing begins with step 310.

In step 310, image data for the image is received, as discussed above with reference to FIG. 1. Step 310 is followed by step 320. In various embodiments, other information is received, as described with reference to optional steps 314, 316, and 318.

In optional step 314, a width of the receiver is received. The width can be expressed in inches, mm, pixels, or another measure. Step 314 is followed by step 320.

In optional step 316, a type of the receiver or ("receiver type") is received. The type can include a specification of surface finish, e.g., glossy or matte. The type can include receiver grammage, fluid absorbance, or surface coating type, chemistry, length, width, or thickness. Step 316 is followed by step 320.

In optional step 318, a selection of a finishing operation is received. Step 318 is followed by step 320.

In step 320, a processor automatically produces data for a polymer pattern and a salt pattern using the image data. In embodiments using step 314, the processor produces at least one of the patterns using the image data and the received width. In some embodiments using step 316, the processor produces at least one of the patterns using the image data and the received type. In embodiments using step 318, the processor produces at least one of the patterns using the image data and the received selection.

Patterns can be produced by an algorithm that uses the image data to create a pattern that correlates with the image content. In some examples, the pattern is different than the image content or does not correlate with the image. For example, the entire receiver can be covered with a uniform layer of polymer. A pattern can be correlated with a part of the image on the page but not another part. For example, certain areas of an image can be given higher (or lower) gloss than other areas. Step 320 is followed by step 330 and step 340, which can be performed in either order. The polymer pattern can be deposited before or after the salt pattern. More than one layer of polymer or salt can be deposited.

In step 330, a salt is deposited on the receiver according to the salt pattern using a salt-deposition unit. In various embodiments, the salt pattern is empty and the step of depositing salt deposits zero grams of salt. Step 330 is followed by step 350.

In step 340, a polymer is deposited on the receiver according to the polymer pattern using a polymer-deposition unit. In various embodiments, the polymer pattern is empty and the step of depositing polymer deposits zero grams of polymer. The salt-deposition unit and the polymer-deposition unit are different units. In various embodiments, the polymer-deposition unit and the salt-deposition unit each includes a respective electrophotographic marking engine. Step 340 is followed by step 350. Optional step 345 can be performed as part of step 340, as discussed below.

In other embodiments, depending on the type of media and any desired effects on the printed receiver (e.g., lightfastness, resistance to smearing, security printing, texture), the processor produces a flood-coat pattern specifying a specific amount of polymer, or a specific amount of salt, but not both. In an example, the print receives a protective overcoat, such as a laminate, varnish, or ultraviolet cured clear coat. In this example, the protective properties of the polymer layer are not needed, so polymer is not deposited. In another example, the receiver is a paper treated for inkjet printing. The surface properties of the receiver cause pigment to preferentially deposit on the surface of the receiver instead of being drawn into the interior thereof. In this example, salt is not deposited as it is not required.

In step 350, liquid ink is deposited on the receiver according to the image data using an inkjet print engine. At least some of the ink is deposited over the deposited polymer or the deposited salt. For example, some of the ink can be deposited directly onto the receiver, and some can be deposited onto the polymer on the receiver. Overspray or unintentional deposition of liquid ink directly on the receiver can occur. The carrier fluid in the ink can be water or can be any of various low-carbon alcohols (e.g., methanol, ethanol, isopropanol, propanol, butanol, isobutanol, and ethylene glycol). Colorant can be suspended or dissolved in the carrier fluid. The carrier fluid can be hydrophilic. Hydrophilic carrier fluids can be polar.

For colorants suspended in the carrier fluid, the suspension can have a zeta potential, as measured using known techniques and commercially available equipment, greater than 60 mV of either sign potential. Conversely, a zeta potential of less than 30 mV is unstable and a zeta potential between 30 mV and 60 mV is semistable. A stable ink containing an aqueous carrier fluid or solvent and suspended pigment particles has a zeta potential whose magnitude is greater than 60 mV.

Salts 248 (FIG. 2B) can be used to cause a pigment colorant suspended in the carrier fluid to come out of suspension in the carrier fluid ("crash") after printing the ink image and before fixing the toner visible image to the receiver or performing another finishing operation. To do this, the zeta potential is reduced to below 30 mV.

Zeta potentials can be reduced to below 30 mV by dissolving salts into the suspension (i.e., the pigment-containing ink). When salts 248 (FIG. 2B) are deposited on receiver 42 (FIG. 2B), the carrier fluid dissolves the deposited salts when it comes into contact with them. Useful salts include water-soluble salts of alkali and alkali earth and halogens, nitrates, or nitrites such as sodium chloride, sodium fluoride, magnesium chloride, magnesium fluoride, potassium chloride, potassium nitrate, and sodium nitrate.

Liquid ink deposited on polymers can be absorbed by the polymers to provide desired print effects, such as glossiness and image permanence.

Step 350 is followed by optional step 360.

Optional step 360 is performed in embodiments using optional step 318, discussed above. After depositing the ink on the receiver, the selected finishing operation received in step 318 is performed. That the received operation is the performed operation is indicated by the dotted line connecting steps 318 and 360. Examples of finishing operations include fixing (tacking or fusing), glossing, drying (e.g., by conductive, convective, or radiative heating, by pressure, or by combinations of these), folding, overcoating, duplexing, laminating, and trimming.

In some embodiments, steps 310, 316, 320, 330 or 340, 350, and 360 are performed. Image data is received in step 310, and the receiver type is received in step 316. The processor automatically produces data for a polymer pattern and a salt pattern using the receiver type (step 320). In some embodiments, only the receiver type is used, and not also the image data.

In step 340, a polymer is deposited on the receiver according to the polymer pattern using a polymer-deposition unit. In step 330, a salt is deposited on the receiver according to the salt pattern using a salt-deposition unit different from the polymer-deposition unit. In step 350, liquid ink is deposited on the receiver, and at least some of the ink is deposited over the deposited polymer or the deposited salt.

In various of these embodiments, the receiver type includes an indication of whether the receiver is to be overcoated. If so, in step 360, the receiver is overcoated after the liquid-ink depositing step.

Figure 4A:
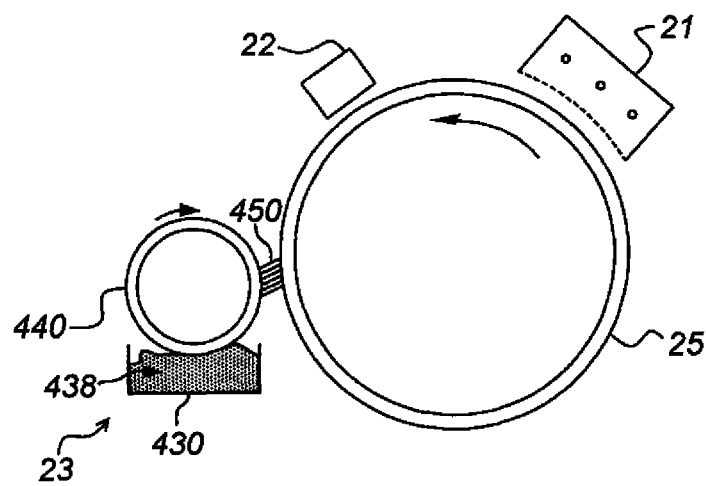
FIG. 4A is a side elevational cross-section of part of an EP deposition unit.
Figure 4B:
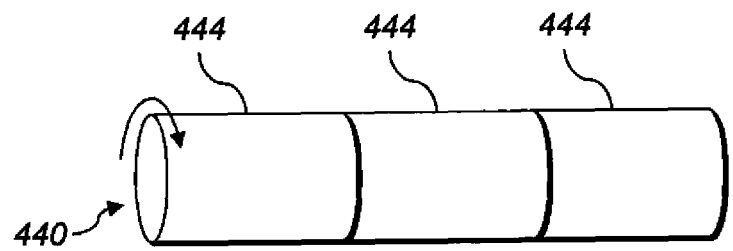
FIG. 4B is a front perspective of segmented transfer roller 440 in the EP deposition unit of FIG. 4A.

Referring to FIGS. 4A-4B, optional step 345 (FIG. 3) will now be discussed. Step 345 is useful in embodiments in which both the polymer and the salt are powders.

FIG. 4A is a side elevational cross-section of part of an EP deposition unit (e.g., deposition engine 31, FIG. 1). Operatively arranged with respect to photoreceptor 25 are charger 21 and exposure subsystem 22, as discussed above with respect to FIG. 1.

At least one of the deposition engines 31, 32 (FIG. 1) includes a respective supply reservoir 430 and a respective segmented transfer roller 440. Supply reservoir 430 holds powder 438, e.g., pigment or salt in powder or granule form. Powder 438 is transferred from supply reservoir 430 to photoreceptor 25 in transfer region 450. Transfer can be performed by charging powder 438 and applying an electric field across transfer region 450 to urge the charged powder 438 on transfer roller 440 towards photoreceptor 25.

FIG. 4B is a front perspective of segmented transfer roller 440. Some segmented transfer rollers useful with various embodiments are described in U.S. Pat. No. 8,023,846, issued Sep. 20, 2011, to Tombs et al., which is incorporated by reference herein. Transfer roller 440 includes a plurality of segments 444 arranged along its length; the segments are electrically insulated from one another. In step 345 (FIG. 3), each segment 444 of the at least one segmented transfer roller 440 is biased independently according to the corresponding pattern (polymer pattern data 83 or salt pattern data 84, both FIG. 1) to transfer the respective powder from the respective supply reservoir 430 to the receiver. This permits depositing powder only in certain strips extending along the in-track direction of the receiver, and not in other strips. Each strip corresponds to one segment 444. In various embodiments, a segmented belt is used instead of a segmented transfer roller.

Figure 5:
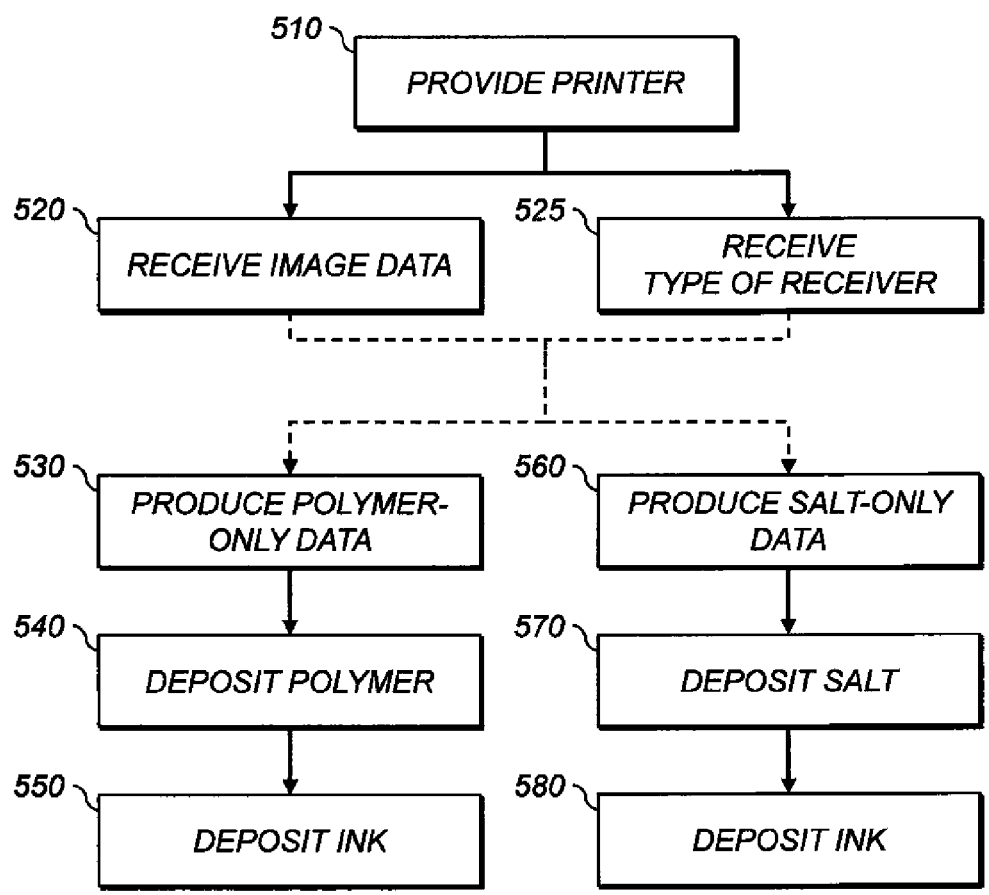
FIG. 5 is a flowchart of methods of printing an image according to various embodiments.

FIG. 5 shows various embodiments of methods of printing an image on a receiver. Processing begins with step 510.

In step 510, the printer is provided. As discussed above, the printer includes a polymer-deposition unit, a salt-deposition unit different from the polymer-deposition unit, and an inkjet print engine. Step 510 is followed by step 520 or step 525.

In step 520, image data is received for an image to be printed. In various embodiments, step 520 is followed by step 530 or step 560.

In step 5250, the type of receiver to be printed on is received. In various embodiments, step 525 is followed by step 530 or step 560.

In various embodiments, in step 530, a processor automatically uses the image data, or the type of the receiver, to produce data for a polymer pattern and to determine that no salt pattern should be produced. Step 530 is followed by step 540.

In step 540, a polymer is deposited on the receiver according to the polymer pattern using the polymer-deposition unit. Step 540 is followed by step 550.

In step 550, liquid ink is deposited on the receiver according to the image data using the inkjet print engine. At least some of the ink is deposited over the deposited polymer.

In other embodiments, in step 560, a processor automatically uses the image data to produce data for a salt pattern and to determine that no polymer pattern should be produced. Step 560 is followed by step 570.

In step 570, a salt is deposited on the receiver according to the salt pattern using the salt-deposition unit. Step 570 is followed by step 580.

In step 580, liquid ink is deposited on the receiver according to the image data using the inkjet print engine. At least some of the ink is deposited over the deposited salt.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST 21 charger
21a voltage source
22 exposure subsystem
23 toning station
23a voltage source
25 photoreceptor
25a voltage source
31, 32 electrophotographic (EP) deposition engine
38 polymer material pattern
39 fused image
40 supply unit
42, 42A, 42B, 42C receiver
48 salt material pattern
50 transfer subsystem
60 fuser
62 fusing roller
64 pressure roller
66 fusing nip
68 release fluid application substation
70 inkjet deposition engine
71 ink manifold
72 heater
76 nozzle
77 ink drop
78 ink image
83 polymer pattern data
84 salt pattern data
86 image data
90 finisher
91 output tray
95 transport web
96 cleaning station
99 logic and control unit (LCU)
100 printer
220h, 220i fluid area
221 carrier fluid
222, 222a, 222b colorant
222c, 222d, 222e colorant
238a, 238b, 238c polymer particle
248, 248a, 248d salt
310 receive image data step
314 receive width step
316 receive type step
318 receive finishing operation selection step
320 produce pattern data step
330 deposit salt step
340 deposit polymer step
345 bias segments step
350 deposit ink step
360 perform finishing operation step
430 supply reservoir
438 powder
440 transfer roller
450 transfer region
444 segment
510 provide printer step
520 receive image data step
525 receive type of receiver step
530 produce polymer-only data step
540 deposit polymer step
550 deposit ink step
560 produce salt-only data step
570 deposit salt step
580 deposit ink step

The invention claimed is:

1. A method of printing an image on a receiver, comprising:
receiving image data for the image;
a processor automatically producing data for a polymer pattern and a salt pattern using the image data;
depositing a polymer on the receiver according to the polymer pattern using a polymer-deposition unit;
depositing a salt on the receiver according to the salt pattern using a salt-deposition unit different from the polymer-deposition unit; and
depositing liquid ink on the receiver according to the image data using an inkjet print engine, wherein at least some of the ink is deposited over the deposited polymer or the deposited salt; and wherein the polymer and the salt are powders and the processor controls an amount of salt or polymer depending on a type of the receiver or desired image effects; wherein the processor receives the type of the receiver being used and bases the salt deposition pattern on the type of receiver.

2. The method according to claim 1, wherein the polymer and the salt are powders and at least one of the deposition units includes a respective supply reservoir and a respective segmented transfer roller or belt, the method further including biasing each segment of the at least one segmented transfer roller or belt independently according to the corresponding pattern to transfer the respective powder from the respective supply reservoir to the receiver.

3. The method according to claim 2, further including receiving a width of the receiver, wherein the processor produces at least one of the patterns using the image data and the received width.

4. The method according to claim 1, wherein the polymer pattern is deposited before the salt pattern is deposited.

5. The method according to claim 1, wherein the polymer is a powder and the salt is a solution of salt molecules in a hydrophilic carrier liquid.

6. The method according to claim 1, further including receiving a type of the receiver, wherein the processor produces at least one of the patterns using the image data and the received type.

7. The method according to claim 1, further including receiving a selection of a finishing operation and, after depositing the ink on the receiver, performing the selected finishing operation, wherein the processor produces at least one of the patterns using the image data and the received selection.

8. The method according to claim 1, wherein the liquid ink includes pigmented colorant.

9. The method as in claim 1, wherein the type of receiver includes surface finish.

10. The method as in claim 1, wherein the type of receiver includes receiver grammage.

11. The method as in claim 1, wherein the type of receiver includes fluid absorbance.

12. The method as in claim 1, wherein the type of receiver includes surface coating type.

13. The method as in claim 1, wherein the type of receiver includes chemistry.

14. The method as in claim 1, wherein the polymer-deposition unit and the salt-deposition unit each includes a respective electrophotographic marking engine, and wherein the type of receiver includes either surface finish, receiver grammage, fluid absorbance, surface coating type or chemistry.

* * * * *